United States Patent [19]

Rastelli et al.

[11] Patent Number: 5,248,395
[45] Date of Patent: Sep. 28, 1993

[54] PROCESS FOR PURIFYING AQUEOUS MEDIA

[75] Inventors: Henry Rastelli, New Fairfield; Jenny L. Pai, Brookfield, both of Conn.; Carl J. Kjellson, Fishkill, N.Y.

[73] Assignee: UOP, Des Plaines, Ill.

[21] Appl. No.: 454,784

[22] Filed: Dec. 26, 1989

[51] Int. Cl.$^5$ .................. B01D 15/0; C02F 1/28
[52] U.S. Cl. .................. 203/41; 203/10; 203/49; 210/672; 210/673; 210/689; 210/691; 210/664; 210/669; 95/142
[58] Field of Search ............ 203/41, 10, 49; 210/664, 669, 673, 694, 908, 672, 689, 691; 55/76

[56] References Cited

U.S. PATENT DOCUMENTS

| 4,236,973 | 12/1980 | Robbins | 203/41 |
| 4,544,488 | 10/1985 | O'Brien | 210/673 |
| 4,648,977 | 3/1987 | Garg et al. | 210/673 |
| 4,725,361 | 2/1988 | Fleming | 210/673 |
| 4,732,609 | 3/1988 | Frey et al. | 210/673 |
| 4,786,418 | 11/1988 | Garg et al. | 210/673 |
| 4,857,198 | 8/1989 | Reidl | 210/673 |
| 4,892,664 | 1/1990 | Miller | 55/46 |

FOREIGN PATENT DOCUMENTS 0561125 7/1958 Canada .................. 203/41

Primary Examiner—Virginia Manoharan
Attorney, Agent, or Firm—Thomas K. McBride; Richard G. Miller

[57] ABSTRACT

Ground water which contains heavy metal ions and toxic volatile organic compounds is purified by passing an air stream through it to purge out the organic compounds, adsorbing the displaced organic compounds on a molecular sieve and destroying them using a strong oxidizing agent such as hydrogen peroxide. This procedure avoids having the heavy metal ions from the water collect on the molecular sieve which causes the destruction of the oxidizing agent.

11 Claims, 2 Drawing Sheets

PROCESS FOR PURIFYING AQUEOUS MEDIA

FIELD OF THE INVENTION

The present invention relates to the removal of organic impurities from aqueous media such as ground water supplies using a procedure involving air stripping, adsorption and oxidation. More particularly the invention relates to a process wherein volatile organic impurities in aqueous media are removed by air stripping, concentrated by adsorption on a high-silica molecular sieve and thereafter effectively destroyed during regeneration of the adsorbent by conversion to innocuous materials such as carbon dioxide and water by reaction with a strong oxidant such as ozone.

DISCUSSION OF THE PRIOR ART

A major public health concern throughout the world is the contamination of supplies of potable water. Sources of ground water contamination are many and varied and include land fills, agricultural pesticides, leakage from stored gasoline, septic tanks, mining operations, petroleum and natural gas production and improperly constructed and maintained industrial toxic waste dumps. The discharge of chlorinated organics into the environment is a cause of particular concern because of the known or suspected carcinogenic or mutagenic properties of some of these materials and the difficulty with which they are biologically degraded. In many instances chlorinated and other halogenated organic compounds pass through conventional industrial or municipal wastewater treatment plants essentially unaltered.

It has heretofore been proposed to detoxify or treat contaminated water by means of selective adsorption of the organic toxic substances on so-called hydrophobic molecular sieves, i.e., adsorbents which exhibit adsorptive preference for the relatively non-polar organic substances over the strongly polar water. In U.S. Pat. No. 4,648,977, Garg et al., it is proposed to contact a contaminated ground water in the liquid phase with an organophilic molecular sieve whereby the organic contaminants are concentrated as adsorbates and thereafter contacting the adsorbate-loaded molecular sieve with an aqueous solution of a compound which has a standard oxidation potential of at least 0.25 volt. to destroy the organic adsorbate and regenerate the molecular sieve adsorbent. While it was found that during cyclic adsorption and regeneration operation, the aforesaid liquid phase ground water treatment process was effective over the initial cycles, the effectiveness of the process was satisfactory only for a relatively short period.

In an attempt to improve the Garg et al process, it was further proposed to reduce the pH of the aqueous oxidant solution to a value less than 7, preferably to between 1 and 5, during the oxidative regeneration period. This improved process is reported in U.S. Pat. No. 4,786,418, and while the regeneration of the contaminant-loaded adsorbent was in fact significantly more thorough and more rapid insofar as removal of the organic adsorbate was concerned, the effective cyclic lifetime of the adsorbent was not appreciably increased.

Perhaps the most widely used processes for the treatment of water contaminated with volatile organic materials are the so-called air stripping procedure and the method involving the adsorption of the organic values on granulated activated carbon (GAC adsorption). The air stripping process involves stripping the volatile organics from water by contacting the contaminated water with air, most commonly in a countercurrent manner in a packed tower. Contaminated water is introduced at the top of the tower and, as it flows down the tower, the volatile organics are stripped off by air that is flowing upwards following introduction at the bottom of the tower. The treated "clean" water is withdrawn at the bottom. A serious disadvantage with this technique is that the air, that is now contaminated with stripped off organics, is discharged into the atmosphere from the top of the tower. The organic pollutants are thus merely transferred from water to air. The technique, therefore, does not get rid of the undesirable pollutants. Other disadvantages to the method are the inability to deal with non-volatile contaminants such as certain pesticides, and the tendency for the stripping tower to be affected by biological growth.

GAC adsorption processes are capable of removing both volatile and non-volatile contaminants from aqueous media, but require expensive high carbon usage to obtain a purified water having non-detectable levels of impurity. Also the adsorption system is cumbersome to regenerate and, in any event, causes a secondary pollution problem in the disposal of the desorbed impurities.

A combination of both types, i.e., the air stripping and the GAC adsorption process, is disclosed in U.S. Pat. No. 4,544,488 issued Oct. 1, 1985, to R. P. O'Brien In the O'Brien process, volatile organics are air stripped from the water feedstock and the liquid effluent from the stripper is treated with GAC to remove non-volatile impurities.

Other processes are disclosed in U.S. Pat. No. 4,526,692 issued Jul. 2, 1985, to T. L. Yohe and U.S. Pat. No. 4,517,094 issued May 14, 1985, to G. W. Beall. It is also well-known to disinfect or sanitize aqueous media such as recirculating water systems, effluents from food processing industries, paper mills, sewage stations and the like by the introduction of very strong oxidizing agents such as peroxide or ozone. In this regard see U.S. Pat. No. 4,541,944, issued Sep. 17, 1985, to Sanderson. Frequently the waste stream treated with peroxide or ozone is also exposed to ultraviolet light which initiates the oxidation reaction. This technique requires continuous irradiation, involving excess radiation energy when the concentration of the organic impurity is in the parts per billion range. Also, clear water is required for the ultraviolet light to be effective.

SUMMARY OF THE INVENTION

It has now been discovered that aqueous media, particularly ground water, containing hazardous organic impurities and metal values can be effectively decontaminated and the removed impurity constituents effectively and economically destroyed by the process which comprises, (a) passing a liquid feedstock containing from about 5 ppb (wt.) to about 20,000 ppm (wt.) of dissolved organic compounds and at least about 5.0 ppm (wt.) metal values into an air stripping unit wherein air is passed through the feedstock and the volatile organic constituents and water vapor are produced as a vapor phase effluent from said stripping unit and the non-volatile metal values remain in the liquid phase.

(b) passing said vapor phase effluent from said stripping unit through an adsorptive mass of an organophilic zeolitic molecular sieve, said molecular sieve having pore diameters large enough to adsorb at least some of said volatile organic compounds whereby said organic compounds are adsorbed thereon, and (c) regenerating said absorptive mass by contact with a compound having a standard oxidation potential of at least 0.50 volt, and further contacting the regenerated molecular sieve with additional organic-containing vapor phase effluent from said stripping unit.

It will be understood that in step (c) of the above-defined process, the regeneration of the adsorptive mass can be accomplished either cyclically or continuously or both. In the cyclic mode of operation, the vapor phase effluent from the stripping unit is passed in the absence of an oxidant such as ozone through the adsorptive mass whereby the organic compounds are adsorbed thereon to any desired degree, but usually until the adsorptive capacity of the adsorbent for the organics has been utilized to a predetermined degree. Thereafter, the oxidant is passed through the organic-loaded adsorbent mass until a predetermined degree of adsorptive capacity for organics has been reestablished. In the continuous regeneration mode, the oxidant composition is admixed with the vapor phase effluent from the stripping unit, either prior to entry into the zone containing the adsorbent or interjected into the adsorbent zone simultaneously with the stripper effluent. Using this technique the adsorbed organic compounds are immediately engaged in the oxidative destruction action and, with appropriate control of proportions of oxidant and stripper effluent, the process can be run continuously with only a single adsorption bed.

DETAILED DESCRIPTION OF THE INVENTION

The liquid water feedstocks suitably treated by the process of this invention are not critical as to their source. Ground water, industrial waste streams, effluents from municipal sewage treatment facilities and the like are all suitable feedstocks provided they contain as a solute at least about 5 ppb (wt.) of volatile organic impurities and at least 5 ppm (wt.) of non-volatile metal values as hereinafter defined. As used herein and in the claims, the term volatile organic constituents means those constituents which are capable of being stripped from the liquid media in a conventional air stripping apparatus and contained in the vapor phase effluent from such a unit.

The organic contaminants most frequently found in ground (well) water include chloro-organics such as tetrachloroethylene, trichloroethylene, 1,1,1,-trichloroethane, carbon tetrachloride, chloroform, monochlorobenzene, dichlorobenzene, methylene chloride, benzene, toluene, xylenes, ethylbenzene, chlorodibromomethane and dibromochloropropane, and can include organic cyanides, mercaptans and certain naturally occurring organics commonly referred to as "humics". Of course, in any particular location the water feedstock may contain any organic molecular species since essentially any organic material existing in nature or synthesized by man can ultimately find its way into the environment and hence into a water source. As evidenced by the experimental data appearing hereinafter, the various organic contaminants are not all oxidized with equal ease. A significant difference in oxidative susceptibility is observed, for example, between halogenated olefins and halogenated paraffins, the latter being far more difficult to oxidize.

The metal value content of the feedstock water being treated in accordance with the present invention is of significance not because of any useful function the metal performs in carrying out the process, but rather because of their ubiquitous presence in water sources which have not been specifically treated to remove them. Although we do not wish to be bound by any particular theory, it is believed that in prior proposed processes in which water feedstocks were treated using high-silica molecular sieve adsorbents coupled with oxidative regeneration of such adsorbents, it is the presence of these metals in the feedstocks which are taken up and accumulated by the adsorbent along with the organic species that interferes with the oxidative activity of the oxidants used to destroy the adsorbed organic species. It is likely that the metals react with the oxidants or catalyze their decomposition, thus competing with the reaction between the oxidants and the organic species.

By the term "metal values" as used herein is meant the polyvalent metals of Groups IIA, IIB, IIIA, IIIB, IVA, IVB, VA, VB, VIB, VIIB and VIII of the Periodic Table of the Elements (Handbook of Chemistry and Physics, Thirty Eighth Edition, Chemical Rubber Publishing Co., USA, pages 394–395). As used herein the term polyvalent includes divalent as well as higher valences. Of these metals, calcium, magnesium, manganese, iron and aluminum are almost universally present in environmental waters in significant amounts. Among the more common transition metals present, in addition to manganese and iron, are cobalt, nickel, copper, zinc, cadmium and lead. Iron and manganese are particularly active in the decomposition of ozone and peroxides.

It is important to the operability of the present process that the zeolitic molecular sieve adsorbent utilized has an adsorptive preference for the less polar organic materials with respect to water. As a general rule the more siliceous the zeolite, the stronger the preference for non-polar adsorbate species. Such preference is observable when the framework molar $SiO_2/Al_2O_3$ ratio is at least 12, and is highly developed in those zeolite species having $SiO_2/Al_2O_3$ ratios of greater than 50. A wide variety of zeolites can now be directly synthesized to have $SiO_2/Al_2O_3$ ratios greater than 50, and still others which cannot at present be directly synthesized at these high ratios can be subjected to dealumination techniques which result in organophilic zeolite products. High temperature steaming procedures involving zeolite Y which result in hydrophobic product forms are reported by P. K. Maher et al, "Molecular Sieve Zeolites," Advan. Chem. Set., 101, American Chemical Society, Washington, D.C., 1971, p 266. A more recently reported procedure applicable to zeolite species generally involves dealumination and the substitution of silicon into the dealuminated lattice site. This process is disclosed in U.S. Pat. No. 4,503,023 issued Mar. 5, 1985, to Skeels et al. Many of the synthetic zeolites prepared using organic templating agents are readily prepared in a highly siliceous form—some even from reaction mixtures which have no intentionally added aluminum. These zeolites are markedly organophilic and include ZSM-35 (U.S. Pat. No. 3,702,886); ZSM-11 (U.S. Pat. No. 3,709,979); ZSM-12 (U.S. Pat. No. 3,832,449) and ZSM-35 (U.S. Pat. No. 4,016,245) to name only a few. It has been found that the silica polymorphs known as silicalite, F-silicalite and TEA-silicate are particularly suitable for use in the present invention and are thus preferred. Though not, strictly speaking, zeolites, because of a lack of ion-exchange capacity, these molecular sieve materials are included within the terms zeolite or zeolitic molecular sieve as used herein.

These materials are disclosed in U.S. Pat. Nos. 4,061,724; 4,073,865 and 4,104,294, respectively. Not only are high-silica zeolites organophilic, but it has also been found that they are resistant towards crystal lattice degradation from contact with the strongly oxidizing compounds used to oxidatively degrade the organic impurities in the second (or regenerative) stage of the present process. Such a lack of resistance toward oxidation makes activated carbon adsorbent generally unfit for use in this process.

The oxidizing agents used to regenerate the adsorbent are those oxidants which do not contain the metal values set forth hereinabove and which have a standard oxidation potential of at least 0.50 volt, and preferably greater than 1.5 volts. Illustrative of compounds which have such oxidation potentials are the chlorates ($ClO_3-$), the hypochlorites (O—Cl—), and hydrogen peroxide, peroxysulfates and ozone. These compounds have the following respective standard oxidation potentials which range from 0.63 volt, to greater than 2.00. The peroxides, peroxysulfates and ozone having oxidation potential greater than 1.5 are particularly preferred oxidants. The above-mentioned compounds can contain various monovalent cations in association with the specified anions. For instance, the compounds can be in the forms of metal salts, such as the alkali metal salts, or even ammonium salts. As utilized to contact the organic-loaded zeolite adsorbent, the oxidizing compounds are most commonly in the form of aqueous solutions, but in the case of ozone, a particularly preferred oxidant, the regeneration can, and preferably is, accomplished by passing an ozone-containing gas stream through the adsorbent mass. The gas stream is advantageously comprised of oxygen, nitrogen and ozone, since ozone is conveniently generated by subjecting air to an electric arc. The concentration of ozone in the regenerating stream is not critical, but is preferably at least 0.3 volume percent.

The concentration of the oxidation compound in an oxidizing solution is also not narrowly critical. Of course, if extremely dilute solutions of the oxidation agent are employed, protracted contact times may be required. On the other hand, highly concentrated solutions require relatively brief contact times. In general the concentrations of the oxidizing compound can range from about 0.1 to about 90% (wt.), preferably at least 0.3%, although preferred concentration ranges vary among the suitable oxidizing agents. A preferred oxidizing agent is $H_2O_2$, which can be used as the pure compound, i.e., 100%, but for safety considerations, lower concentrations in aqueous solution in range of about 20 to 40 weight percent are recommended. Ozone is also a preferred oxidant.

The contact time of the oxidizing agent and the organic-loaded zeolite will depend upon the particular oxidizing compound employed, its concentration, the temperature of contact and the degree of oxidation of the organic substrate desired. Contact periods between 0.5 hours and 72 hours are typical. The temperature can vary from about 0° C. to 95° C., but is not a critical factor.

In carrying out the process the adsorption and regeneration procedures are typically accomplished by passing the feedstock vapor to be treated and the oxidizing regenerate through a packed or fixed bed of the adsorbent. The process can, however, be carried out in a number of other arrangements common to the adsorption and water treatment art. For continuous operation, a treatment system involving at least two fixed beds of zeolite adsorbent is advantageously employed so that regeneration of spent beds can be conducted while other fresh beds are engaged in the adsorption-purification stage.

ILLUSTRATIVE EMBODIMENT

Figure 1:
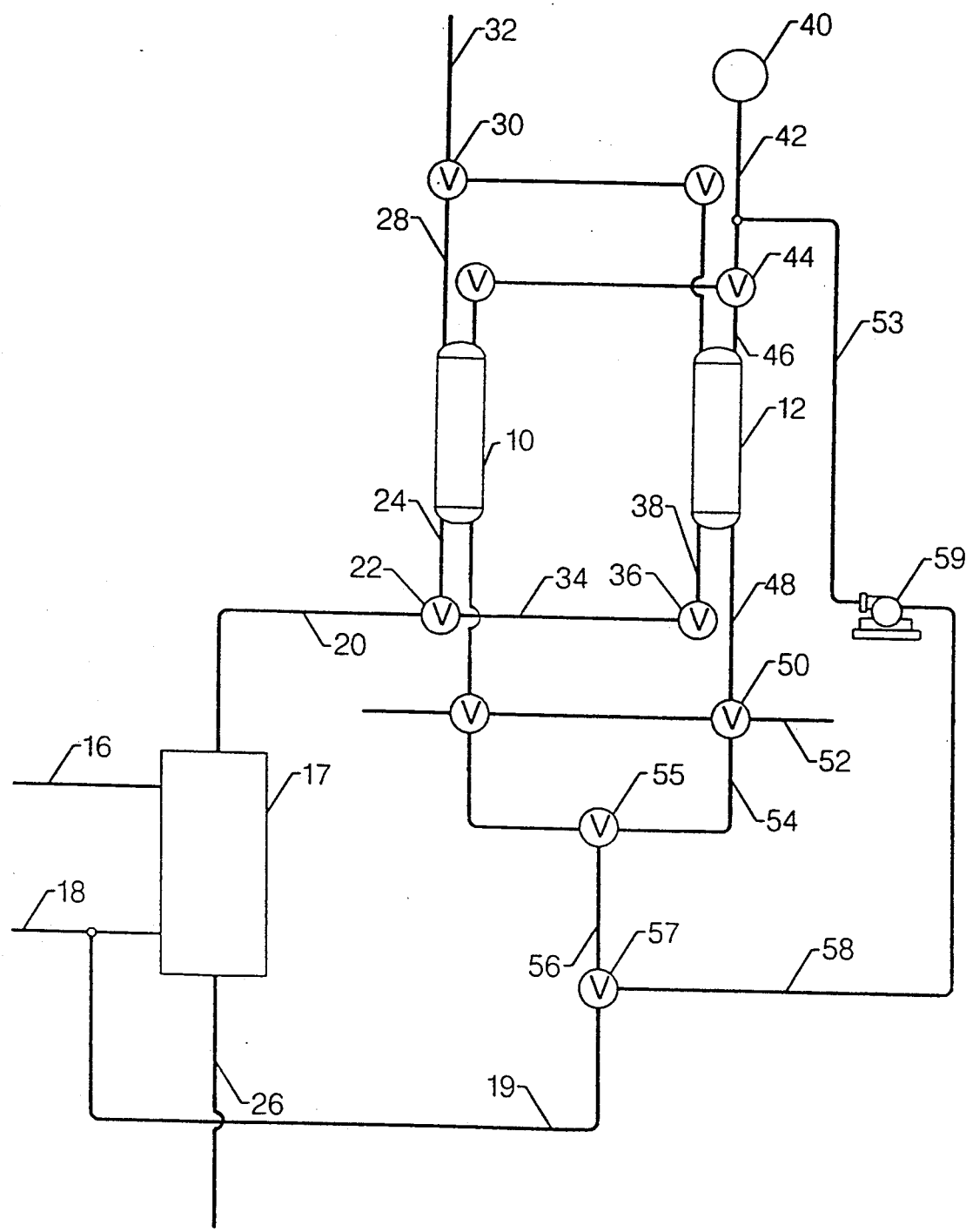
FIG. 1 is a schematic flow diagram illustrating one embodiment of the present invention in which regeneration of the adsorbent mass by oxidation of the adsorbed organic substrates is carried out in a cyclic manner.

With reference to FIG. 1 of the drawings, the present process with cyclic regeneration of the adsorbent bed is illustrated involving the following procedure: Adsorption beds 10 and 12 are packed with silica-bonded 1/16 inch diameter extruded silicalite particles. Contaminated feedstock water containing 200 ppm (v.) organic impurities and 20 ppm (wt.) metal values of which calcium, iron and manganese constitute together the major proportion, is passed into the system through line 16, into air stripping unit 17. Air is injected into the feedstock water in unit 17 through line 18 in the conventional manner so that thorough contact between the air bubbles and the water is achieved. Stripping air in admixture with water vapor and volatile organic molecular species volatilized from the water feedstock is continuously removed from the stripper through line 20 and passed at ambient temperature into bed 10 through valve 22, line 24. Decontaminated water still containing the metal values is removed from the system through line 26. In its passage through bed 10, the organic constituents of the vapor phase effluent from stripper 17 are adsorbed on the silicalite adsorbent and the unadsorbed water vapor and air leave bed 10 through line 28 and valve 30 and are vented from the system through line 32. The flow of the vapor stream through bed 10 is continued until breakthrough of the organic constituents, and thereupon the vapor stream from stripper 17 is passed via valve 22 through line 34, valve 36 and line 38 into adsorption bed 12 which has been regenerated for removal and oxidative destruction of adsorbed organics from a previous adsorption stage therein. The regeneration of bed 10 follows the same procedure as in bed 12 which in the latter case comprises passing a mixture of ozone and air formed in ozone generator 40 through line 42, valve 44 and line 46. The concentration of ozone in the regenerant gas stream is about 1.0 vol. %, and the space velocity through the bed is maintained at a relatively low rate to avoid undue purge desorption of bed 12 without reaction of the desorbate with the ozone. The extent of oxidation of the organics depends largely upon the particular organic species involved, it being the primary objective to break down toxic or otherwise undesirable compounds to environmentally acceptable materials. The creation of large reaction exotherms in the bed during regeneration should also be avoided to the extent necessary to avoid undue thermal desorption of unoxidized adsorbate organics. The innocuous decomposition reaction products from bed 12 are removed from the system through line 48, valve 50 and line 52. The recycling of incompletely oxidized organic moieties, if required, can readily be accomplished by passage through line 54, valve 55, line 56, valve 57 and thence through lines 19 and 18 in conjunction with the air stream from line 18 to stripper 17. As an alternative procedure, the recycling of incompletely oxidized organic moieties from bed 12 can be passed in whole or in part through valve 57, line 58, compressor 59 and line 53 back to line 42 wherein it is admixed with ozone from generator 40 before again passing through valve 44 and line 46 into bed 12. This type of recycle not only places incompletely oxidized organic moieties in contact with a relatively high concentration of ozone, but also utilizes any non-reacted ozone which passes through bed 12.

Figure 2:
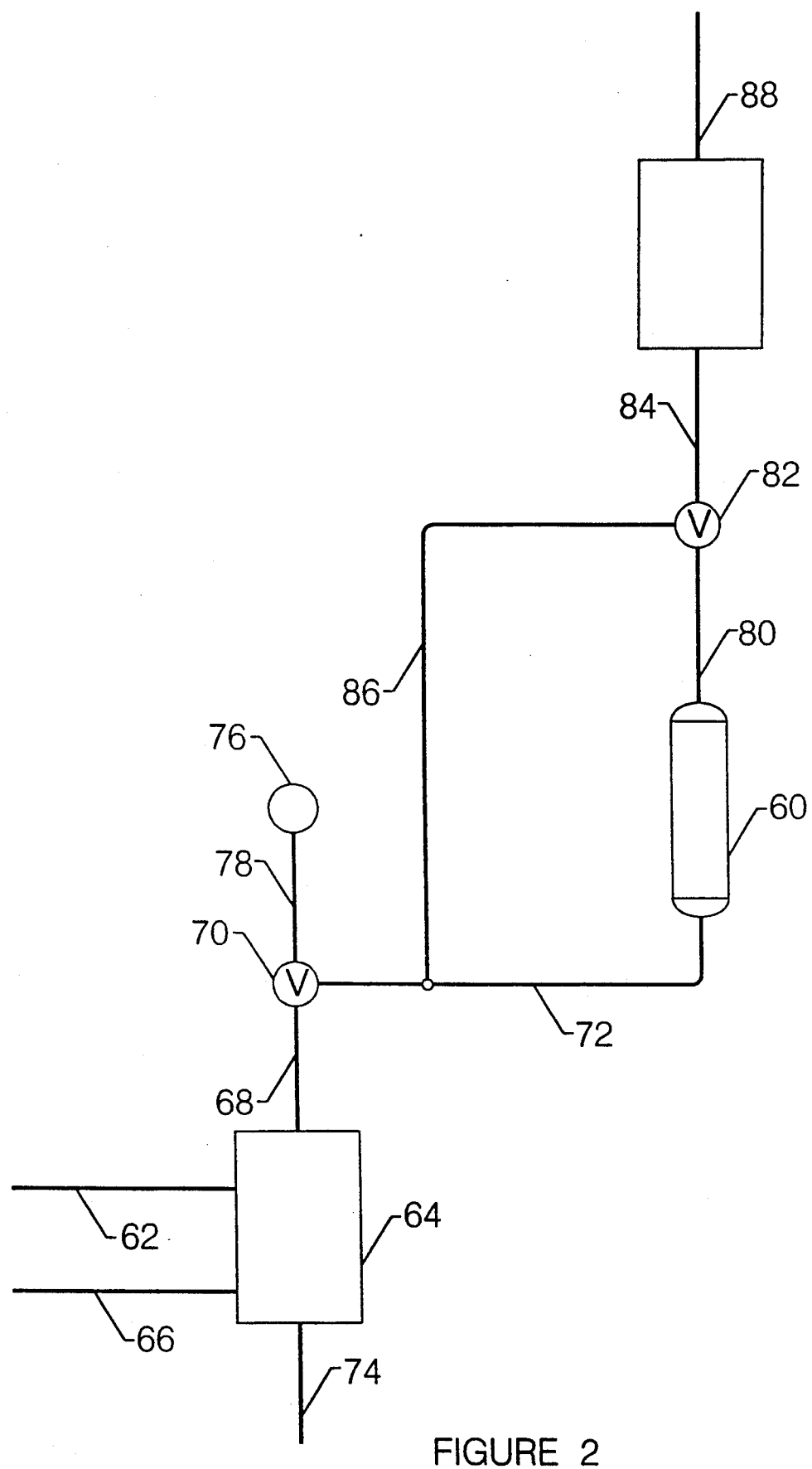
FIG. 2 is a schematic flow diagram illustrating another embodiment of the present process in which regeneration of the adsorbent mass by oxidation is carried out in a continuous manner.

The process embodiment involving continuous regeneration of the bed is illustrated with reference to FIG. 2 of the drawings. In FIG. 2 adsorption bed 60 is packed with silica-bonded 1/16 inch diameter extruded silicate particles. Contaminated feedstock water containing 175 ppm (v.) organic impurities and 10 ppm (wt.) metal values comprising calcium, iron and manganese is passed into the system through line 62 into air stripping unit 64. Air is injected into the feedstock water in unit 64 through line 66 in the conventional manner so that thorough contact between the air bubbles and the water is achieved. Stripping air in admixture with water vapor and volatile organic molecular species volatilized from the water feedstock is continuously removed from the stripper through line 68 and passed at ambient temperature into bed 60 through valve 70 and line 72. Decontaminated water still containing the metal values is removed from the system through line 74. In ozone generator 76 oxygen of an air stream is converted partially into ozone and the resulting mixture of oxygen, nitrogen and ozone is fed through line 78 and valve 70 into line 72 wherein it mixes with the vapor phase effluent from air stripper 64. The mixture in line 72 is further passed into bed 60 wherein adsorption of the organics and reaction of the adsorbed organics with ozone occurs. The effluent from bed 60 through line 80 contains unreacted ozone, oxygen, nitrogen and the by-products of the reactions between ozone and the organics. If the oxidation in a single pass through bed 60 is adequate to accomplish the desired purpose of destroying noxious and/or toxic organic species, the entire effluent is passed through valve 82 and removed from the system through line 84 and bed 88 containing activated sodium zeolite X which thoroughly decomposes any ozone in the vent stream. If further oxidation is desired, some or all of the effluent can be recycled through line 86 to line 72 where additional ozone is introduced prior to again being passed through bed 60.

The following experimental procedures were carried out to further illustrate specific aspects of the present invention. In carrying out the experiments, two basic procedures were utilized, namely an adsorption/regeneration cyclic procedure and a co-feed or continuous regeneration procedure. These procedures are described below:

ADSORPTION/REGENERATION CYCLIC METHOD

Twenty grams of adsorbent (14×30 mesh) were charged to a ⅜" ID×18" stainless steel column. Adsorption flow was established by bubbling air at the rate of 15 scfh through a stainless steel Pope vessel containing water to produce a water-saturated air stream. Another stainless steel Pope vessel was charged with 100 grams of the volatile organic contaminant to be adsorbed and oxidized, and a metered amount of the organic in the vapor phase, depending upon the desired concentration of organic, was blended with the water-saturated air stream. The flow containing the desired concentration of organic was run for about two hours bypassing the column until a steady concentration was reached. The adsorption flow was then directed through the column, downflow, at 14-20 scfh and run until breakthrough was established (10% of feed). The bed was then regenerated using 0.3-1.0 vol % ozone at 4 scfh. During regeneration, bed temperatures, ozone concentration and $CO_2$ make were monitored. Concentration of organic in the effluent stream was also measured until $CO_2$ leveled out. Following regeneration, another adsorption was run at similar conditions to the previous adsorption and differences in breakthrough loadings were measured. Depending upon the results of these differences, if any, the bed was subjected to further ads/regen cycles.

CO-FEED CONTINUOUS REGENERATION METHOD

Twenty grams of adsorbent (14×30 mesh) were charged to a ⅜" ID×18" stainless steel column. Adsorption flow was established by bubbling air at the rate of 15 scfh through a stainless steel Pope vessel containing water to produce a water-saturated air stream. Another stainless steel Pope vessel was charged with 100 grams of the volatile organic contaminant to be adsorbed and oxidized, and a metered amount of the organic in the vapor phase, depending upon the desired concentration of organic, was blended with the water-saturated air stream. The flow containing the desired concentration of organic was run for about two hours bypassing the column until a steady concentration was reached. While the adsorption stream equilibrated, the regeneration gas flow was started by passing air through the ozone generator at 20 scfh. Feed rate to the co-feed stream was 1-1.5 scfh. The balance was sent through a column of sodium zeolite X which destroyed the remaining ozone. When all flows were at equilibrium, these streams were blended and passed through the column, downflow, until a steady state was obtained. Steady state is defined as that time when the concentration of organic, as measured in the column effluent, remained unchanged following 4-12 hours of operation.

In the experiments reported hereinafter, the adsorbents were (a) silica-bonded F-silicalite, (b) alumina-bonded silicalite and, (c) silica-bonded silicalite. The silica-bonded F-silicalite (hereinafter identified as FS-1) was selected because of its inertness. During the synthesis of FS-1 fluoride salts are present which prevent even terminal hydroxyl groups from forming on the silica lattice thereby producing a more inert surface. The inert surface is believed to be desirable to minimize non-productive ozone decomposition and ensure that sufficient ozone reaches the adsorbed organics to effect their destruction.

The alumina-bonded silicalite (hereinafter identified as S-1) and the silica-bonded silicalite (hereinafter identified as S-2) were tested to determine the effect, if any, differences in the binder or acidity would have upon ozone oxidation. In aqueous phase ozone oxidation, the ozone is converted to the hydroxyl radical at high pH values (>8). Since the hydroxyl radical (oxidation potential=2.80 volts) has a higher oxidation potential than ozone (2.07 volts), organic oxidation proceeds much faster in aqueous solutions with a pH >8. The alumina bonded S-1 is acid washed during preparation and has a slurry pH of 6.0. In the operation of the present process in the vapor phase, but contacting the adsorbent with gas streams containing relatively large concentrations of water, the opportunity is provided also to convert some of the ozone to hydroxyl radicals, particularly when using silica bonded S-2 which has not been acid washed and this has a slurry pH of 9.0.

EXAMPLE 1

(a) Using the cyclic method defined hereinabove, adsorbent FS-1 was utilized to adsorb and ozone was used to oxidize trichloroethylene (TCE). The results are shown in Table I.

(b) Adsorbent S-1 was utilized in three experiments (identified in Table I as b-1, b-2 and b-3) involving the adsorption and oxidation of trichloroethylene (TCE) under similar conditions, i.e., water-saturated air streams containing between 53 and 58 ppm (v) TCE. Two of the samples, b-1 and b-3 were regenerated in situ with 1.0 vol. % ozone in air. The results are set forth in Table I.

(c) Adsorbent S-2 was tested in the adsorption and oxidation of TCE for purposes of comparison with adsorbent S-1 in view of the higher slurry pH of the former (pH=~9). The test results are set forth in Table I.

(d) To demonstrate the importance of using a hydrophobic adsorbent in the process of the present invention, amorphous hydrophilic silica gel was tested using a TCE-containing water-saturated air feed stream. The results are set forth in Table I.

From the data of Table I, a number of observations can be made. In experiment (a) the FS-1 adsorbent showed a fresh bed TCE breakthrough (5 ppm) loading of 1.4 weight percent at a feed concentration of 28 ppm. A regeneration was conducted using 2.6 mole % ozone which yields a ratio of 20 moles $O_3$/mole TCE adsorbed. At this ratio, 40% of the carbon present in the adsorbed organic is converted to $CO_2$, thus establishing the beneficial operability of the present process.

In experiments (b-1), (b-2) and (b-3) the fresh bed loadings of TCE on the adsorbent ranged from 3.0 to 4.3 weight percent. After regeneration with 1.0 vol. % ozone in air, the second cycle loading of the adsorbent in b-1 and b-3 at similar TCE feed concentrations (53–55 ppm) was found to be 2.8 and 3.0 respectively which represents >80% return to fresh bed loading. Conversion to $CO_2$ was 25–30% with 1.0% $O_3$/air compared to 40% for 2.6% $O_3/O_2$. With this low conversion rate in mind, it is surprising that the 2nd cycle loadings are so high (>80% of fresh). One possible explanation is that partial oxidation to intermediately oxidized species (alcohol, aldehyde, carboxylic acid, CO, etc.) may have occurred and these were not analyzed for. Also some TCE may have been desorbed as TCE during the regeneration. A simple acidity measurement which involved slurrying 1 gram adsorbent in 15 ml of $H_2O$ and measuring the pH with pH paper was done on the starting and final product. The initial pH of $Al_2O_3$ bonded S-1 was 6.0 and after two adsorption/ regeneration cycles was 5.0. It appears that the regeneration causes the adsorbent to become more acidic.

In experiment (c) of Example 1, the test using adsorbent S-2 was run under the same conditions as in experiment (b-3). On the S-2 adsorbent the TCE loading is a little lower (3.0 versus 3.7 weight percent), but at the same ozone/TCE ratio, a higher efficiency to $CO_2$ formation is demonstrated (43% of theoretical conversion to $CO_2$) for the first regeneration. The adsorption capacity is retained on the second cycle (3.3 weight percent), but the second regeneration $CO_2$ conversion is lower and more in line with the results produced by the S-1 adsorbent. It was noted that the slurry pH of the S-2 adsorbent decreased from an original value of 9 to 4.0 after two adsorption/regeneration cycles.

In the matter of the comparison test with silica gel involved in experiment (d) of Example 1, the breakthrough loading for the silica gel was 0.2 weight percent, or less than 10% of the loading on the silicalites tested. Because the first cycle loading was so low, the $O_3$/TCE molar ratio is unusually high (52) but this led to only 23% conversion of TCE to $CO_2$. It is not surprising that on the second cycle adsorption, breakthrough occurred immediately and no loading was measured. Silica gel is thus established to be a much inferior material for treating "wet" VOC containing streams. The significance of the hydrophobic nature of the silicalites is dramatically demonstrated by these test results.

EXAMPLE 2

Using the adsorption/regeneration cyclic procedure, a sample of S-2 adsorbent was tested for effectiveness in the adsorption and oxidation of chloroform (TCM). TCM having no double bonds and only one carbon atom bonded to three chlorine atoms and one hydrogen atom is very difficult to oxidize and cannot be suitably oxidized with ozone in aqueous solutions. Using the present procedure, it was found that 14 percent of the adsorbed TCM was decomposed by ozone to form $CO_2$ on the first regeneration cycle. Second cycle adsorption revealed almost immediate breakthrough, showing that more severe regeneration conditions, such as a combination of ozone with hydrogen peroxide, should be employed. A similar experiment using 1,2-dichloroethane gave similar results. Following a fresh bed breakthrough adsorption of 3.3 weight percent at a feed concentration of 62 ppm (v.), the regeneration immediately following showed minimal $CO_2$ formation.

EXAMPLE 3

Cyclic adsorption/regeneration procedure tests were run with a mixture of 90% toluene and 10% mixed xylenes (TX). The average feed concentrations were 30–35 ppm toluene and 2.5–3.0 ppm mixed xylenes. Fresh bed loading was 1.1 wt % and the following three cycles steadied out at 0.8 wt % TX loading. Regenerations were carried out using 1% ozone at 4 scfh (std. cond.) and run until the generation of $CO_2$ leveled out, about 180–200 minutes. This led to high $O_3$/TX mole ratios as most of the $CO_2$ came out in the first 30 minutes. Also, since $CO_2$ make was low (10–18%) based on the TX adsorbed and the cycled loading was maintained, it is probable that the majority of carbon was stripped off as partially oxidized species. These species, if toxic, can be recycled to extinction.

EXAMPLE 4

(a) In order to determine the effectiveness of the co-feed continuous regeneration method, it was necessary to first conduct adsorption tests on the adsorbents and organic substrates (VOC) to be used to determine the minimum time to achieve breakthrough loadings. These breakthrough loadings must be executed in the actual regeneration tests in order to establish that regeneration has occurred. The adsorbent tested was S-2 and the organic substrates were trichloroethylene (TCE), chloroform (TCM), a 90–10 mixture of toluene and xylenes (TX) and dichloroethane (DCA). The results are set forth in Table II.

with the toluene/xylene mix showed better performance, destroying 27% of the aromatics present. 1,2 dichloroethane (DCA) proved to be just as difficult to oxidize as chloroform, with 6% being oxidatively destroyed (experiment 4(c)-3). The results are set forth in Table III.

TABLE I

| Exp # | Adsorbent Material | Cycle | 5 ppm B/T Loading Wt % | VOC Feed ppm | Volume $O_3$%/Air Feed | Molar Ratio $O_3$/VOC | $CO_2$ Make % Theory | VOC |
|---|---|---|---|---|---|---|---|---|
| 1(a) | FS-1 | Fresh | 1.4 | 28 | 2.6 + | 20.0 | 40 | TCE |
| " | " | 2nd | 0.4 + + | — | − + | — | — | " |
| 1(b)-1 | S-1 | Fresh | 3.0 | 58 | 1.0 | 6.8 | 93 + + + | " |
| " | " | 2nd | 2.8 | 55 | 1.4 | 6.8 | 26 | " |
| 1(b)-2 | S-1 | Fresh | 4.3 | 58 | 1.0 | 4.9 | 31 | " |
| 1(b)-3 | S-1 | Fresh | 3.7 | 53 | 1.0 | 6.0 | 29 | " |
| " | " | 2nd | 3.0 | 53 | 1.0 | 6.8 | 27 | " |
| 1(c) | S-2 | Fresh | 3.0 | 50 | 1.0 | 6.8 | 43 | " |
| " | " | 2nd | 3.3 | 59 | 1.0 | 6.8 | 28 | " |
| 1(c) | SiGel | Fresh | 0.2 | 57 | 1.0 | 52.0 | 23 | " |
| " | " | 2nd | 0.0 | 55 | — | — | — | " |

+ $O_3/O_2$ mixture used. All other tests $O_3$/Air.
+ + Did not wait for breakthrough, expt. terminated.
+ + + Possible contamination led to high $CO_2$ generated.

(b) The initial co-feed experiments were run using TCE at a feed concentration of 60–73 ppm. Adsorbent S-2 (14×30 mesh) was the adsorbent used in all these experiments. Each experiment was run for 6–12 hours (substantially beyond breakthrough) to insure that steady state was achieved. Approximately 6 moles of $O_3$ per mole of TCE were mixed in the feed, similar to the ratios used in the cyclic tests. Ninety-nine percent of the feed TCE was destroyed on S-2 under these conditions. Three tests were run at different humidity levels (80%, 40%, 0%) showing no difference indicating that moisture does not adversely affect S-2 performance. An empty column test 4(b)-3 was run (10% destruction) to prove the catalytic performance of the S-2. The results are set forth in Table III.

TABLE II

| Exp # | VOC | Feed ppm | B/T Time Minutes | B/T Conc. ppm | B/T Loading Wt. % |
|---|---|---|---|---|---|
| 4(a)-1 | TCE | 50 | 225 | 5.0 | 3.0 |
| 4(a)-2 | TCM | 50 | 100 | 5.0 | 0.9 |
| 4(a)-3 | TX | 32 | 250 | 0.2 | 1.1 |
| 4(a)-4 | DCA | 34 | 660 | 0.2 | 3.3 |

B/T = Breakthrough

TABLE III

| Exp # | Org. | Molar Ratio $O_3$/VOC | VOC Concentration Ave In ppm | VOC Concentration Ave Out ppm | % VOC Removed | Time Hrs | Relative Humidity |
|---|---|---|---|---|---|---|---|
| 4(b)-1 | TCE | 5.3 | 73 | <1 | 99 | 13 | 80% |
| 4(b)-2 | TCE | 5.5 | 71 | <2 | 99 | 6 | 40% |
| 4(b)-3* | TCE | 6.4 | 60 | 54 | 10 | 0.6 | 80% |
| 4(b)-4 | TCE | 5.3 | 73 | <1 | 99 | 6 | 0% |
| 4(c)-1 | TCM | 7.7 | 50 | 45 | 10 | 6 | 80% |
| 4(c)-2 | BTX | 20 | 30 | 22 | 27 | 41 | 80% |
| 4(c)-3 | DCA | 18 | 33 | 31 | 6 | 24 | 80% |

*Blank column

The presence of hazardous oxidation by-products were monitored during a typical TCE/$O_3$ feed experiment. Samples of the effluent, at steady state, were taken and analyzed using Draeger tubes. A concentration of 1.5 ppmv of phosgene was measured. Effluent samples monitored from a blank column run showed 0.05 ppmv of phosgene present. The formation of phosgene presents no environmental problem in the practice of the present process since it can be recycled to the stripper unit or brought into contact with some other body of water which results in its immediate conversion to HCl and $CO_2$.

(c) Chloroform (TCM) was selected as the next candidate. Experiment No. 4(c)-1 reveals that even in a co-feed mode, TCM is still extremely resistive (10% destruction) to oxidation. The co-feed test result (4(c)-2)

In general, it has been found that the extent of oxidation of adsorbed organic substrates using ozone is directly proportional to the ozone concentration in contact with the organic substrate. Accordingly, a recycle of ozone is more advantageous than is a reduction in the inlet concentration of ozone.

It has also been established, by performing an oxygen mass balance in conjunction with an oxidative regeneration using ozone in an oxygen-containing stream, that at least some of the oxygen involved in the reaction with the adsorbed organic substrate is derived from the oxygen rather than the ozone. This provides the opportunity to employ sub-stoichiometric amounts of ozone in the processes of the present invention.

What is claimed is:

1. Process for purifying an aqueous media which comprises:
   (a) passing a liquid water feedstock containing from about 5 ppb (wt.) to about 20,000 ppm (wt.) of dissolved volatile organic compounds and at least about 5 ppm (wt.) metal values into an air stripping unit wherein air is passed through the feedstock and the volatile organic constituents and water vapor are produced as a vapor phase effluent from said stripping unit and the non-volatile metal values remain in the liquid phase (b) passing said vapor phase effluent from said stripping unit through an adsorptive mass of an organophilic zeolitic molecular sieve, said molecular sieve having pore diameters large enough to adsorb at least some of said volatile organic compounds whereby said organic compounds are adsorbed thereon, and (c) regenerating said adsorptive mass by contact with a compound free of polyvalent metal moieties and having a standard oxidation potential of at least 0.50 volt, and thereafter contacting the regenerated molecular sieve with additional organic-containing vapor phase effluent from said stripping unit.

2. Process according to claim 1 wherein the regeneration step (c) is carried out following termination of the adsorption step (b).

3. Process according to claim 1 wherein the regeneration step (c) is carried out simultaneously with the adsorption step (b).

4. Process according to claim 1 wherein the metal values are present in the liquid water feedstock in a concentration of at least 10 ppm (wt.).

5. Process according to claim 1 wherein in step (c) the adsorptive mass is regenerated by contact with a compound free of polyvalent metal moieties and having a standard oxidation potential of at least 1.5 volts.

6. Process according to claim 5 wherein the compound having a standard oxidation potential of at least 1.5 volts is hydrogen peroxide.

7. Process according to claim 5 wherein the compound having a standard oxidation potential of at least 1.5 volts is ozone.

8. Process according to claim 5 wherein the organophilic zeolitic molecular sieve has a framework $SiO_2/Al_2O_3$ molar ratio of greater than 12.

9. Process according to claim 5 wherein the organophilic zeolitic molecular sieve has a framework $SiO_2/Al_2O_3$ molar ratio of greater than 50.

10. Process according to claim 8 wherein the molecular sieve is F-silicalite or silicalite.

11. Process according to claim 1 wherein volatile organic constituents comprise halogenated hydrocarbons having at least one unsaturated carbon to carbon bond.

* * * * *